(12) United States Patent
Rieger et al.

(10) Patent No.: US 8,047,194 B2
(45) Date of Patent: Nov. 1, 2011

(54) PROTECTION DEVICE FOR A ROPE SAW ASSEMBLY

(75) Inventors: Hans-Joerg Rieger, Thueringen (AT); Josef Plattner, Maurach (AT)

(73) Assignee: Hilti Aktiengesllschaft, Schaan (LI)

( * ) Notice: Subject to any disclaimer, the term of this patent is extended or adjusted under 35 U.S.C. 154(b) by 281 days.

(21) Appl. No.: 12/157,963

(22) Filed: Jun. 12, 2008

(65) Prior Publication Data

US 2008/0314224 A1    Dec. 25, 2008

(30) Foreign Application Priority Data

Jun. 14, 2007  (DE) .......................... 10 2007 000 330

(51) Int. Cl.
*B28B 1/08* (2006.01)

(52) U.S. Cl. ......................................... 125/21; 451/296
(58) Field of Classification Search .................... 125/21, 125/16.02; 451/296, 452, 454
See application file for complete search history.

(56) References Cited

U.S. PATENT DOCUMENTS

| 1,530,682 | A | * | 3/1925 | Lyman .......................... 83/523 |
| 2,577,523 | A | * | 12/1951 | Horton .......................... 299/35 |
| 3,958,332 | A | * | 5/1976 | Gates et al. ..................... 30/380 |
| 5,875,771 | A | * | 3/1999 | Plattner .......................... 125/21 |
| 6,772,750 | B2 | * | 8/2004 | Plattner et al. .................. 125/21 |

FOREIGN PATENT DOCUMENTS

DE    4012606    9/2005

OTHER PUBLICATIONS

Search Report.

* cited by examiner

*Primary Examiner* — Robert Rose
(74) *Attorney, Agent, or Firm* — Abelman, Frayne & Schwab

(57) ABSTRACT

A protection device for a rope saw assembly (5) includes at least two, telescopically displaceable relative to each other, cover members (12, 13) having each a circular cross-section, an extending along a longitudinal axis receiving space (14) for the saw rope (8), and a longitudinally extending opened slot (15, 16), and provided each with a securing device (18, 20) located on one end (17, 19) of each of the cover members (12, 13) for securing a respective cover member (12, 13) to a respective deflection roller (6, 7) of the rope saw assembly (5).

5 Claims, 2 Drawing Sheets

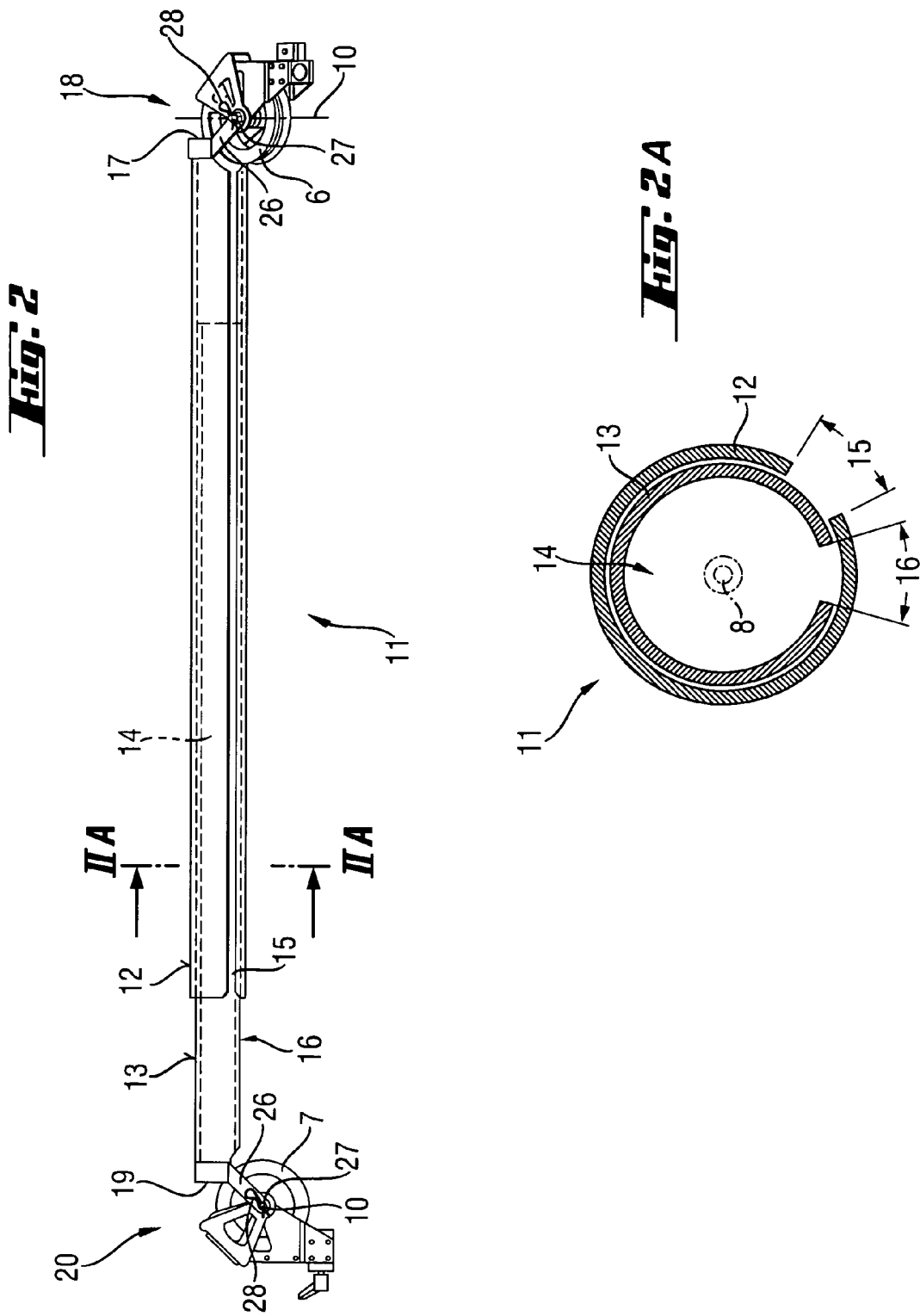

PROTECTION DEVICE FOR A ROPE SAW ASSEMBLY

BACKGROUND OF THE INVENTION

1. Field of the Invention

The present invention relates to a protection device for a rope saw assembly and including at least two, telescopically displaceable relative to each other, cover members having each an extending along a longitudinal axis, receiving space for the saw rope and a longitudinally extending opened slot.

2. Description of the Prior Art

Rope saws are used in particular for sawing large workpieces such as, e.g., stone blocks. A saw rope carries cutting bodies in form, e.g., of sintered diamond pearls and is driven by a motorized drive of the rope saw. Deflection rollers guide the saw rope about a to-be-cut workpiece, with the deflection rollers being arranged in accordance with a profile of a to-be-produced cut. A load applied to the saw rope could cause a rope break, and the broken saw rope would shoot up through the air like a whip.

German Publication DE 10 2004 012 606 A1 discloses an arrangement of a protection device on a rope saw assembly for protecting a broken or torn rope. The protection device includes two telescopically displaceable relative to each other, U-shaped cover members having each an extending along a longitudinal axis, receiving space for the saw rope, and a longitudinally extending opening. The cover members can be arranged with a possibility of a pivotal movement relative to each other by 90°. By flexibly arranging the cover members on the deflection rollers, other angular arrangements of the cover members with respect to the pattern of the deflection rollers can be insured.

The drawback of the protection device of the German Publication consists in that the cover member themselves can pivot relative to each other only by 90°, and for covering other angular deviations, further, specially produced, expensive constructional arrangements are necessary.

The object of the present invention is to provide a protection device for a rope saw that can be easily mounted on freely displaceable sections of the saw rope, and the alignment of the adjacent deflection rollers can be freely selected.

SUMMARY OF THE INVENTION

This and other objects of the present invention, which will become apparent hereinafter, are achieved by providing a protection device of the type discussed above in which the cover members are formed as tubular members at least one of which has a circular cross-section, and a securing device is provided on one end of each of the cover members for securing a respective cover member to a respective deflection roller of the rope saw assembly.

E.g., one of the cover members can have a polygonal cross-section, and the other of the cover member, which is telescopically displaceable relative to the one cover member, can have a circular cross-section with a smaller outer diameter than the inner contour of the polygonal cross-section of the one cover member. Alternatively, the inner diameter of the circular cross-section of the other cover member can be greater than the outer contour of the first cover member.

For mounting the protection device after the rope saw assembly have been formed, the telescopically displaceable relative to each other, cover members are rotated relative to each other so that their opened slots are aligned. Then, the cover members are placed over the saw rope and are secured on respective deflection rollers with the securing devices. As a result the saw rope is surrounded by the cover members in its free region. The securing devices are arranged at the free ends of the respective tubular cover members, which are located opposite each other.

Because of a hollow cylindrical shape of the cover members, they can rotate relative to each other by 360°, so that they can be secured on respective deflection rollers at any arbitrary alignment of the deflection rollers relative to each other and insure as complete as possible covering of the corresponding free-running rope sections. In case of a rope break during a sawing process, the cover members prevent whipping up of the broken rope in the cover region.

Advantageously, all of the cover members have a circular cross-section, which insures a simple alignment of the cover members with each other by their rotation relative to each other.

Advantageously, the securing device has at least one leg provided in an end region of its free end with a through-opening for a fastening element for securing a respective cover member to a respective deflection roller. The securing takes place at the roller axle of a respective deflection roller or at the protective cover of the deflection roller that partially surrounds the roller. The securing device insures an easy attachment of the cover member to the deflection roller, with the cover members automatically pivoting relative to each other around the saw rope after being placed on the saw rope.

Advantageously, the securing device has two legs for encompassing the deflection rollers at least in some regions and which are provided in end regions of their respective free ends with a through-opening for a fastening element for securing a respective cover member to a respective deflection roller. The legs advantageously extend parallel to each other so that the legs encompass the deflection roller in a fork-like manner. Advantageously, the cover members are secured on respective roller axles.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 2 a plan view of a section of the rope saw assembly shown in FIG. 1 at an increased, in comparison with FIG. 1, scale; and FIG. 2A a cross-sectional view along line IIA-IIA in FIG. 2 at an increased, in comparison with FIG. 2, scale.

DETAILED DESCRIPTION OF THE PREFERRED EMBODIMENT

Figure 1:
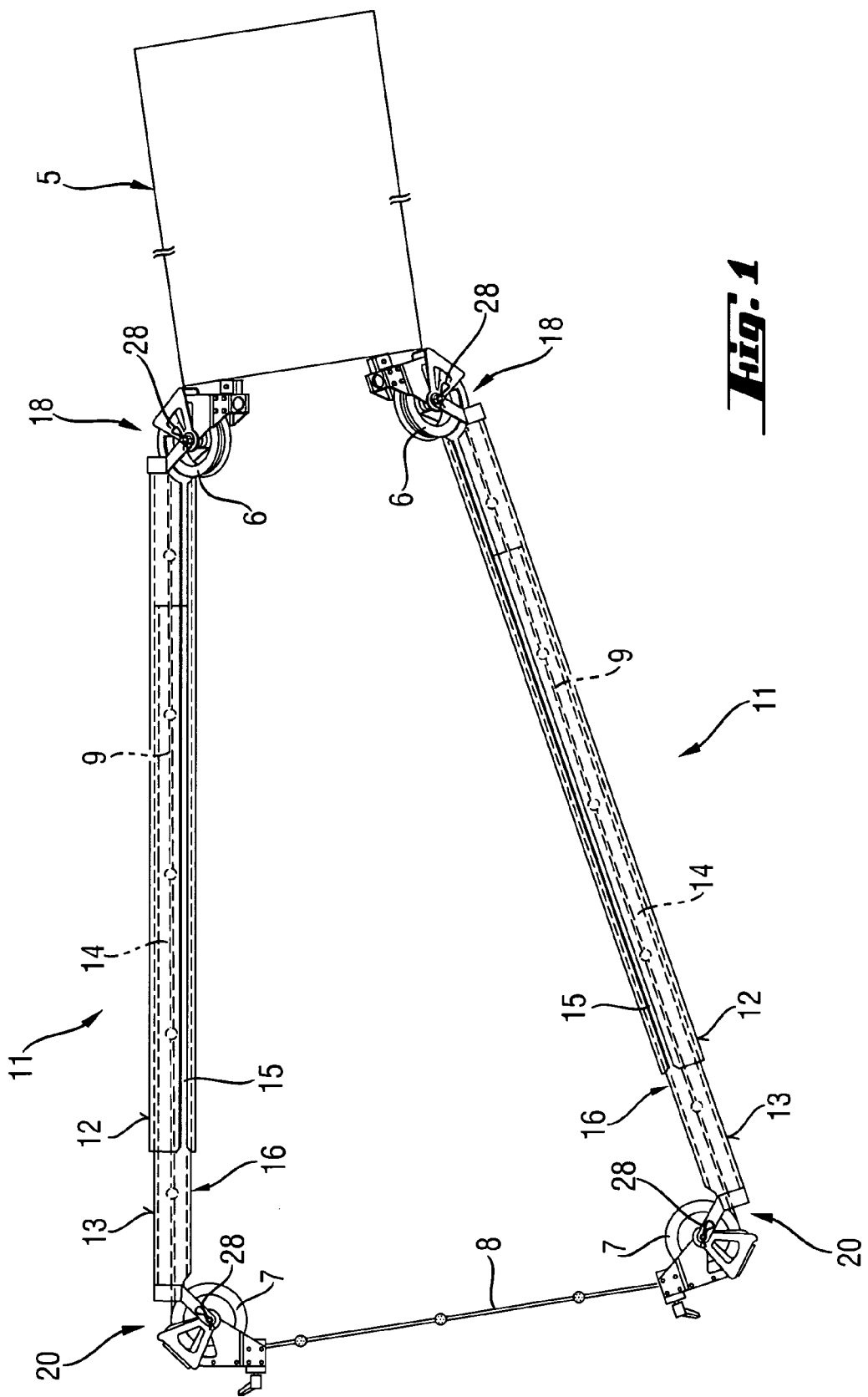
FIG. 1 a plan view of a rope saw assembly with two protection devices each having two cover members.

A rope saw assembly 5 according to the present invention, which is shown in FIGS. 1-2, includes two deflection rollers 6 arranged adjacent to the rope saw, two further deflection rollers 7 which cooperate with the two deflection rollers 6, respectively, and a saw rope 8 displaceable about the deflection rollers 6 and 7. The saw rope 8 is provided with cutting bodies and is driven by a motorized drive of the rope saw assembly 5. Two rope sections 9 of the saw rope 8, which are displaceable freely between respective pairs of rollers 6 and 7, are provided each with a protection device 11 having two cover members 12 and 13 telescopically displaceable relative to each other. Each of the cover members 12 and 13 has an extending along a longitudinal axis, receiving space 14 for the saw rope 8 and an opened slot 15 and 16, respectively, for mounting of the protection device 11 on the rope saw assembly 5. The cover members 12 and 13 are formed as tubular member having a circular cross-section and provided, respectively, at their free ends 17 and 19, with a device 18 and 20, respectively, for securing the cover members 12 and 13 to the deflection rollers 6 and 7 of the rope saw assembly 5, respectively.

The securing devices 18 and 20 are essentially identical and each includes two, extending parallel to each other, legs 26 which at least partially encompass a respective roller 6 and 7. The legs 26 have, in their end region, through-openings 27 for fastening elements 28 for securing the cover members 12 and 13 on an axle 10 of the respective rollers 6 and 7. The fastening element 28 is formed, e.g., as a split pin with a retaining clip, which is inserted through the hollow axle 10 of the deflection roller 6 and 7, respectively, for securing the cover member 12 and 13.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A protection device for a rope saw assembly (5) having at least one pair of spaced from each other, deflection rollers (6, 7) and a saw rope (8) guided about the deflection rollers (6, 7), the protection device comprising at least two, telescopically displaceable relative to each other and rotatable relative to each other, cover members (12, 13) having each an extending along a longitudinal axis, receiving space (14) for the saw rope (8) and a longitudinally extending opened slot (15, 16), the cover members (12, 13) being formed as tubular members each having a circular cross-section; and a securing device (18, 20) provided on one end (17, 19) of each of the cover members (12, 13) for securing a respective cover member (12, 13) to a respective deflection roller (6, 7) of the rope saw assembly (5).

2. A protection device according to claim 1, wherein the securing device (18, 20) has at least one leg (26) provided in an end region of a free end thereof with a through-opening (27) for a fastening element (28) for securing a respective cover member (12, 13) to a respective deflection roller (6, 7).

3. A protection device according to claim 2, wherein the securing device (18, 20) has two legs (26) for encompassing the respective deflection roller (6, 7) at least in some regions both legs (26) being provided in end regions of respective free ends thereof with a through-opening (27) for a fastening element (28) for securing the respective cover member (12, 13) to the respective deflection roller (6, 7).

4. A rope saw assembly, comprising at least one pair of spaced from each other, deflection rollers; a saw rope (8) guided about the deflection rollers (6, 7); and a protection device including at least two, telescopically displaceable relative to each other and rotatable relative to each other, cover members (12, 13) for covering a section of the saw rope (8) extending between the deflection rollers (6, 7) and having each an extending along a longitudinal axis, receiving space (14) for the saw rope (8) and a longitudinally extending opened slot (15, 16), the cover members (12, 13) being formed as tubular members each having a circular cross-section, and a securing device (18, 20) provided on one end (17, 19) of each of the cover members (12, 13) for securing a respective cover member (12, 13) to a respective deflection roller (6, 7) of the rope saw assembly (5).

5. A rope saw assembly according to claim 4, wherein the longitudinally extending opened slots (15, 16) of the cover members (12, 13) are aligned with each other.

\* \* \* \* \*